(No Model.) 2 Sheets—Sheet 2.
J. F. PACKER.
LAND ROLLER.
No. 369,873. Patented Sept. 13, 1887.
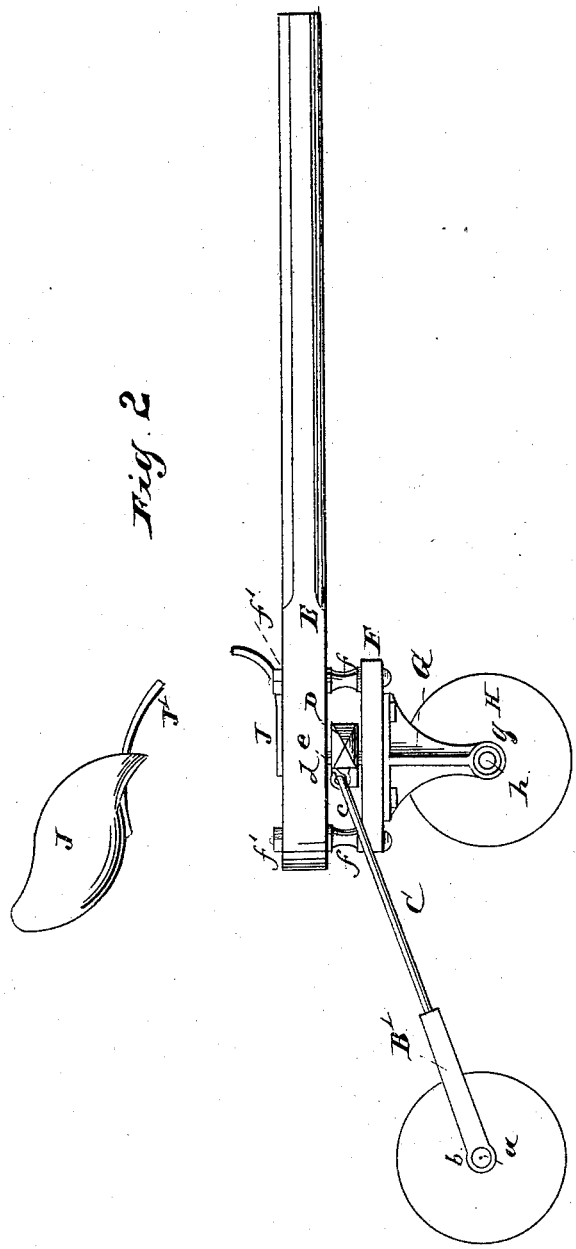
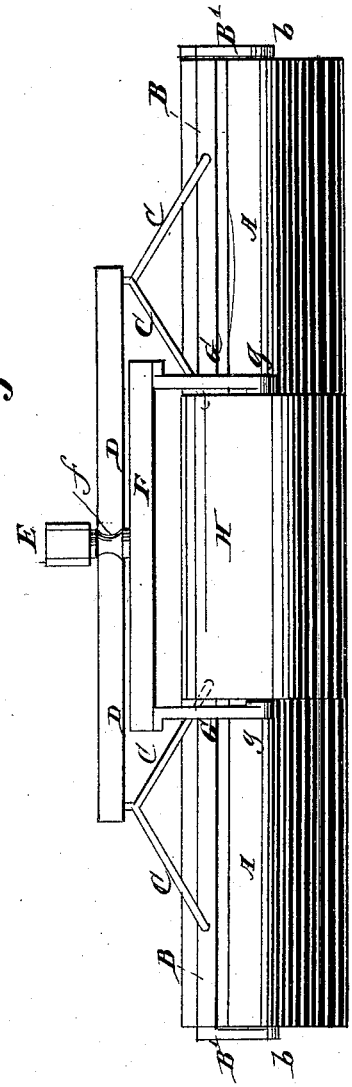
Witnesses:
Albert H. Adams
C. W. Bond
Inventor:
John F. Packer

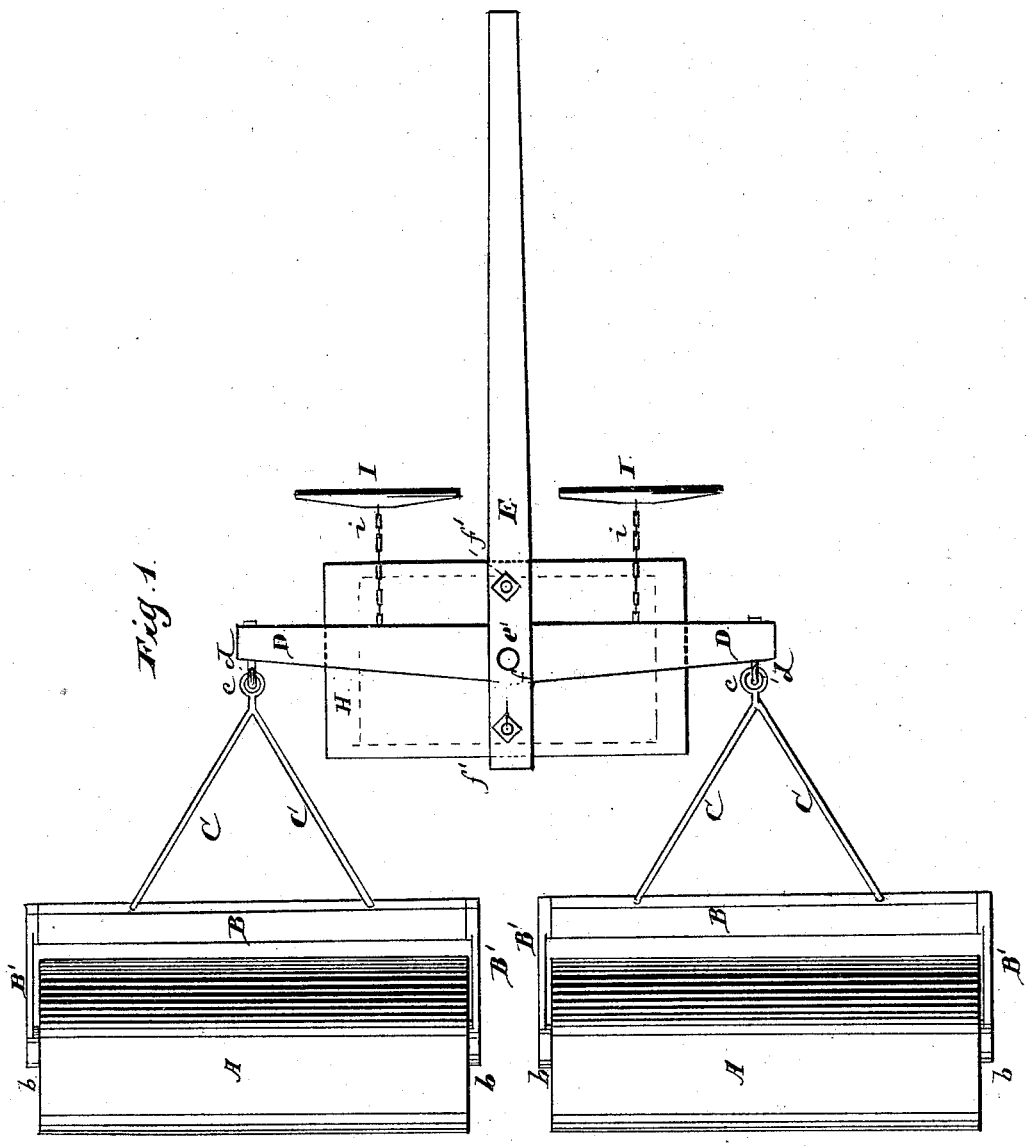

UNITED STATES PATENT OFFICE.

JOHN F. PACKER, OF CHICAGO, ILLINOIS, ASSIGNOR TO THE DAVID BRADLEY MANUFACTURING COMPANY, OF SAME PLACE.

LAND-ROLLER.

SPECIFICATION forming part of Letters Patent No. 369,873, dated September 13, 1887.

Application filed July 10, 1885. Serial No. 171,239. (No model.)

*To all whom it may concern:*

Be it known that I, JOHN F. PACKER, residing at Chicago, in the county of Cook and State of Illinois, and a citizen of the United States, have invented a new and useful Improvement in Land-Rollers, of which the following is a full description, reference being had to the accompanying drawings, in which—

Figure 1 is a top or plan view with the seat removed; Fig. 2, a side elevation with the seat-standard broken; Fig. 3, a front elevation.

The object of this invention is to construct a land-roller in which the controlling power for the front roller is directly from the tongue, and in which the rear rollers are controlled independent of and in unison with the front roller, thus putting the control of all the rollers in effect under the tongue, and also to equalize the draft for the rear rollers, so that in turning at the end of a field or otherwise each animal will draw equally its share of the load; and its nature consists in journaling the front roller to a frame or support to which the tongue is rigidly connected, so that the movement of the tongue acts directly on the roller; in providing a draw-bar or doubletree located between the tongue and the support for the front roller, to the ends of which the respective side rollers are connected by draft-rods; in providing a long hitch between the doubletree or draft-equalizer and the singletrees, by which in turning the equalizer is not drawn in close proximity to the animal, but maintained at a sufficient distance for safety, and in the several parts and combinations of parts, hereinafter described, and pointed out in the claims as new.

In the drawings, A represents the rear rollers, which may be of any of the usual and well-known forms of construction, provided at the ends with suitable pins or trunnions, *a*, to allow them to turn freely.

B is a cross-bar, one for each roller A, each bar having at its ends arms or end pieces, B', in the ends *b* of which are journaled the pins or trunnions *a*. These parts B B' constitute the frames for the rollers.

C represents draw-rods having at their forward ends an eye or opening, *c*, for attaching purposes, and, as shown, the draw-rods are forked from near their forward ends outwardly to the rear, so as to draw uniformly on the roller-frames, and the draw-rods are connected to the roller-frames by having the turned end for each arm to enter a hole in the draw-frame and be there held by a nut or pin; or the ends of the draw rods can be secured to the frames by eyebolts or in some other suitable manner.

D is the draw-bar or doubletree, the ends of which when the parts are together come in line, or nearly so, with the center of the respective rollers, and at each end is a hook, *d*, to receive the eye *c* of the draw-rod C.

E is the tongue, of the required length for the animals and for the attachment of its rear end to the support for the front roller.

F is a plate or bed piece of wood or other suitable material, to which is secured, by standards *f* and bolts *f'*, the tongue E, the standards supporting the tongue above the bed F, to leave a space between the tongue and bed for the location of the doubletree D, and the doubletree is held in position by a bolt, *e*, passing through the tongue and doubletree and into the plate or bed F.

G represents brackets depending from the under side of the bed or plate F at each end and having at their lower ends boxes or bearings *g*.

H is the front roller, located between the brackets G and below the bed or plate F, and having at each end a pin or trunnion, *h*, to enter the box or bearing *g* on the brackets, on which pins or trunnions the roller H turns or revolves.

I represents the singletrees, adapted to receive the hitch of the team, and each singletree is attached to the doubletree on each side of the tongue by a chain, *i*, each chain being of sufficient length to give a long hitch between the doubletree and singletree, by which the doubletree will not be drawn up in close proximity to the animal in turning around.

J is a seat attached to the top of the tongue by a standard or post, J'.

The operation is as follows: The tongue E being rigidly connected to the plate or bed F by the standards *f* and bolts *f'*, and the bed or plate being connected with the front roller, H, by the brackets G, it will be seen that the movement of the tongue to the right or left by drawing of the team around imparts a drawing movement to the front roller, by which such roller is turned with and directly from the tongue; and as the doubletree or draft-equalizer D is located between the tongue and bed and connected therewith in a pivotal manner by the bolt e, the turning of the tongue and bed or plate does not affect the doubletree or draft-equalizer, which is controlled entirely by the team through the singletrees I and long hitch furnished by the chains i or other means, so that in turning to the left the right-hand rear roller will be swung around in an arc of a circle, while the left-hand rear roller forms a pivot or fulcrum around which the front roller, H, and right-hand roller turn, and in this movement it will be seen that as the rear rollers are carried by the doubletree or draft-equalizer D the left-hand animal carries an equal amount of the strain or resistance with the right-hand animal, as the bar D equalizes the power between the two animals, and in turning to the left the right-hand rear roller becomes the pivot or fulcrum around which the front roller and the left-hand rear roller turn, and in thus turning the two animals carry equally through the draft or equalizing bar D, and one animal cannot carry more than its share of the load.

It will thus be seen that in use the front roller is controlled wholly and entirely from the tongue, while each rear roller is controlled independent of the front roller, and yet in unison with the movements of such roller, through the connection with the doubletree or equalizing-bar D, to the ends of which the rear rollers are attached, so that in turning the front roller turns with the tongue, and at the same time as the animals swing around the doubletree or equalizing-bar operates and carries around either one or the other of the rear rollers, according to the direction of turning, the result being that each rear roller is controlled by an animal, while the front roller is controlled by the tongue, which in turn is controlled by the animals. The long hitch between the doubletree and the singletree on each side gives the animal plenty of room in turning without liability of drawing the equalizing-bar so far forward as to interfere with the free movements of the animals, and such long hitch does not interfere with the operation of the rollers.

What I claim as new, and desire to secure by Letters Patent, is—

1. The combination, with the tongue, of the plate F, rigidly connected therewith, the roller H, journaled in supports pendent from said plate, the doubletree D. and the rolls A, journaled in independent frames B B', connected to the ends of the doubletree, substantially as described.

2. The combination, with the tongue E, having the plate F rigidly connected therewith, of the roller H, journaled in pendants on said plate, the doubletree D, pivotally mounted between said tongue and plate, the rollers A A, and the independent frames B B', connected by draw-rods C to the ends of the doubletree, substantially as described.

3. The rollers A, independent frame B B', draft-rods C, and doubletree or equalizing-bar D, in combination with the singletrees I and hitch i, substantially as and for the purpose specified.

JOHN F. PACKER.

Witnesses:
ALBERT H. ADAMS,
O. W. BOND.